United States Patent
Matsuda

(10) Patent No.: US 8,248,505 B2
(45) Date of Patent: Aug. 21, 2012

(54) IMAGING DEVICE FOR ADDING PIXEL SIGNALS HAVING DIFFERENT TIMING

(75) Inventor: Seisuke Matsuda, Tokyo (JP)

(73) Assignee: Olympus Corporation, Tokyo (JP)

( * ) Notice: Subject to any disclaimer, the term of this patent is extended or adjusted under 35 U.S.C. 154(b) by 296 days.

(21) Appl. No.: 12/645,776

(22) Filed: Dec. 23, 2009

(65) Prior Publication Data

US 2010/0165163 A1 Jul. 1, 2010

(30) Foreign Application Priority Data

Dec. 26, 2008 (JP) ................................. 2008-333578

(51) Int. Cl.
H04N 5/222 (2006.01)
(52) U.S. Cl. ................................. 348/333.11
(58) Field of Classification Search .................. 348/239, 348/333.01, 333.11
See application file for complete search history.

(56) References Cited

U.S. PATENT DOCUMENTS

| | | | | |
|---|---|---|---|---|
| 5,694,167 A | * | 12/1997 | Hashimoto | .................... 348/297 |
| 2001/0030708 A1 | * | 10/2001 | Ide et al. | ........................ 348/362 |
| 2004/0090537 A1 | * | 5/2004 | Kubo | ......................... 348/223.1 |
| 2007/0229699 A1 | * | 10/2007 | Hamamura et al. | ........... 348/362 |
| 2011/0075010 A1 | * | 3/2011 | Border et al. | .................. 348/362 |

FOREIGN PATENT DOCUMENTS

JP 2003-069897 A 3/2003

\* cited by examiner

*Primary Examiner* — Jason Whipkey
(74) *Attorney, Agent, or Firm* — Westerman, Hattori, Daniels & Adrian, LLP

(57) ABSTRACT

An imaging device comprises a pixel array, a reading unit, a pixel signal addition unit, and a display unit. A plurality of pixels including a first pixel and a second pixel are arranged in two dimensions in the pixel array. The first and second pixels have a photoelectric conversion elements and output pixel signals according to the quantities of incident light to the photoelectric conversion elements. The reading unit reads a first pixel signal from the first pixel and reads a second pixel signal from the second pixel. The pixel signal addition unit adds the first pixel signal read from the first pixel with a plurality of different timings and adds the second pixel signal read from the second pixel with a plurality of different timings. The display unit displays the first pixel signal added by the pixel signal addition unit and the second pixel signal added by the pixel signal addition unit sequentially with different timings.

5 Claims, 8 Drawing Sheets

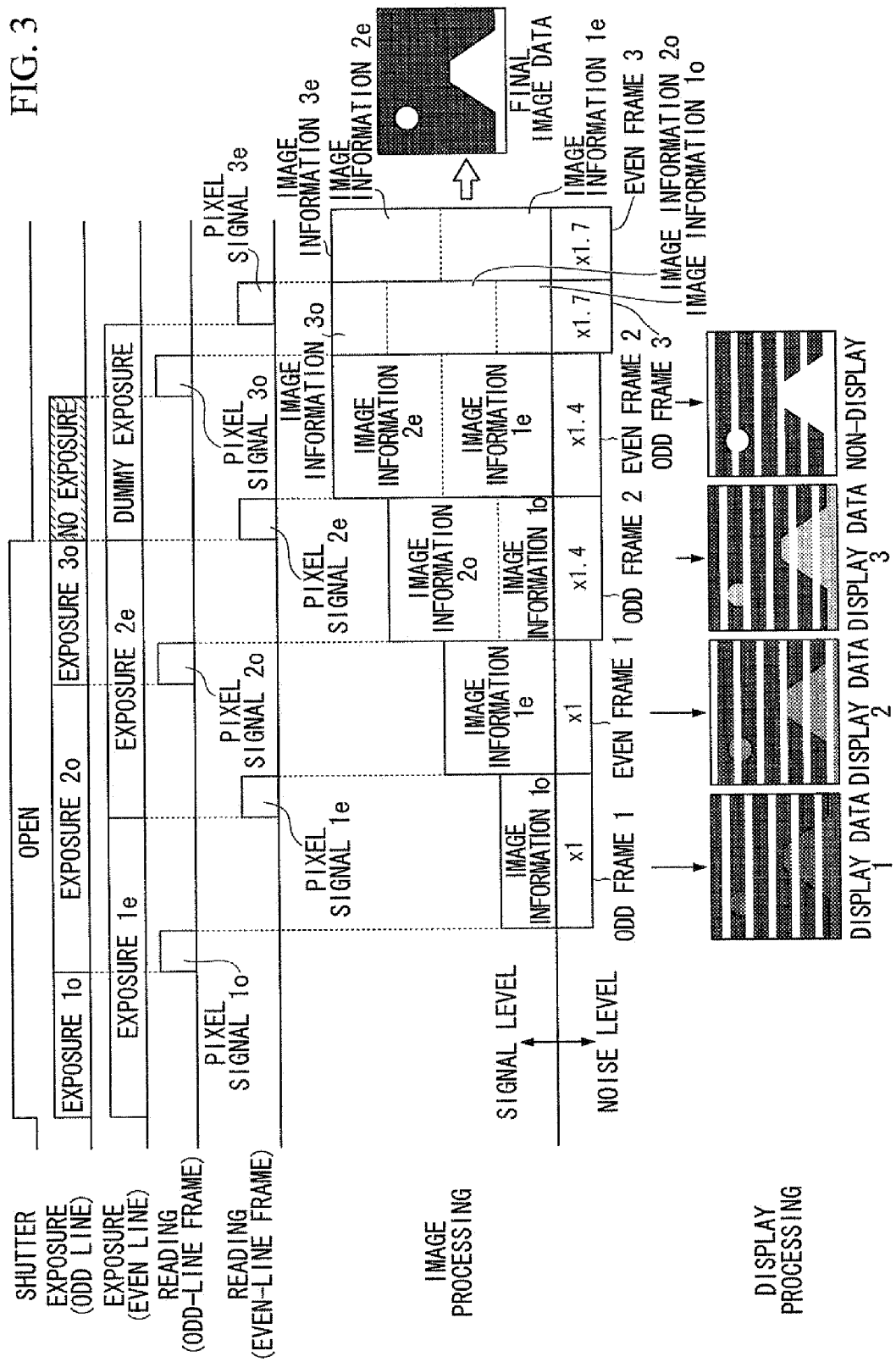

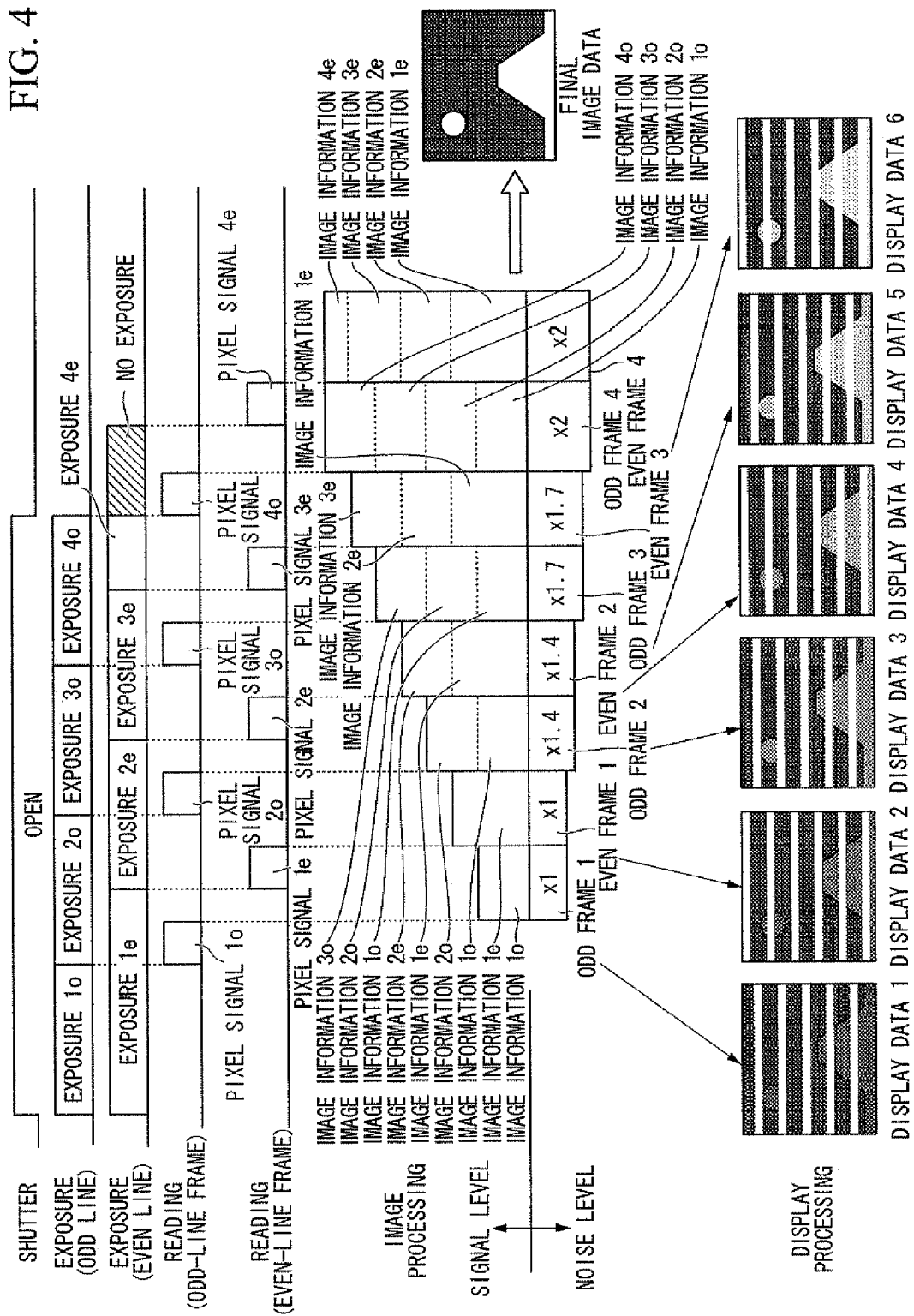

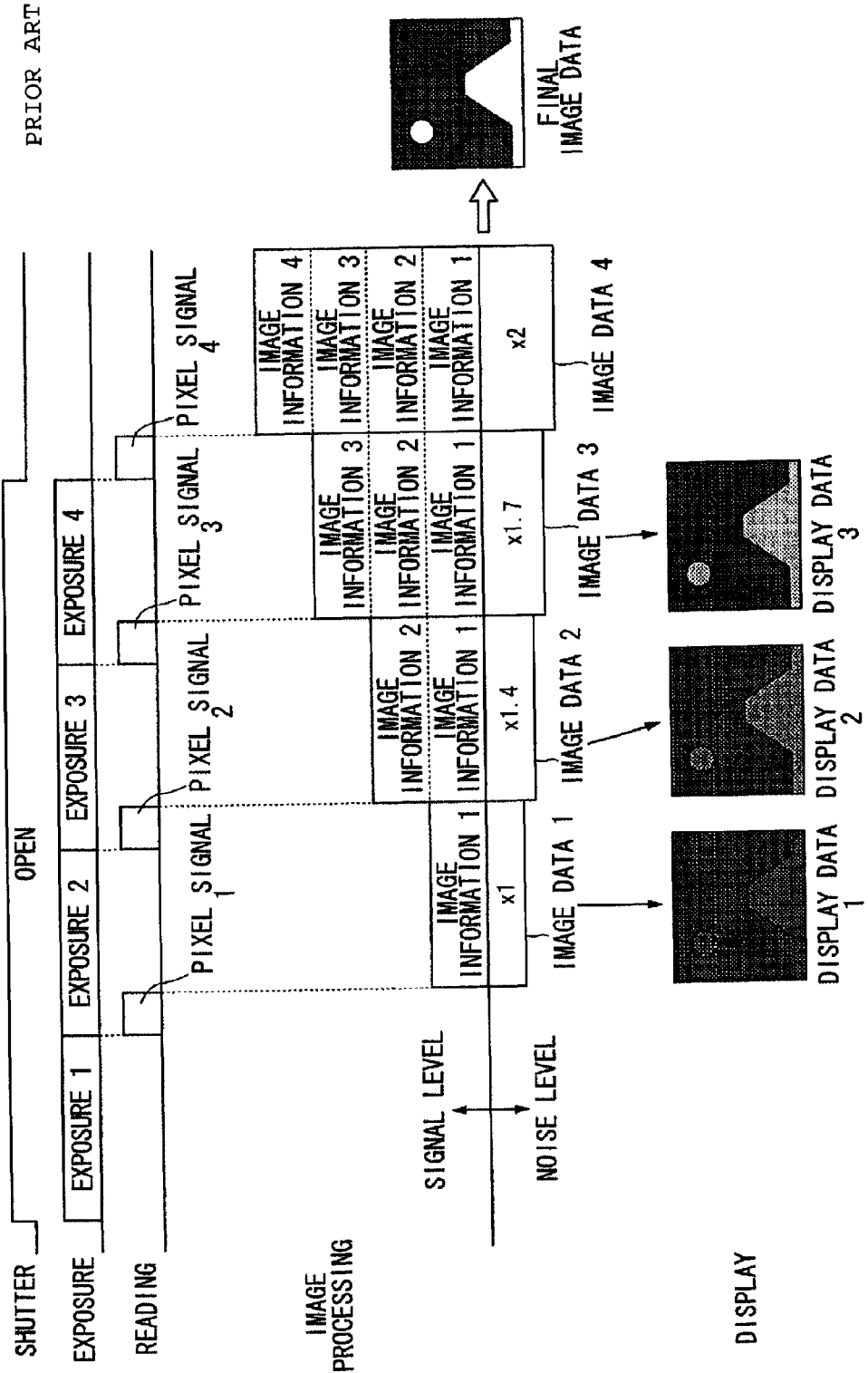

IMAGING DEVICE FOR ADDING PIXEL SIGNALS HAVING DIFFERENT TIMING

BACKGROUND OF THE INVENTION

1. Field of the Invention

The present invention relates to an imaging device.

Priority is claimed on Japanese Patent Application No. 2008-333578, filed Dec. 26, 2008, the content of which is incorporated herein by reference.

2. Description of Related Art

When a subject is picked up using an imaging element, such as a CCD (Charge Coupled Device) or a CMOS (Complementary Metal Oxide Semiconductor) image sensor, a technique known as prolonged exposure which obtains a proper amount of exposure by lengthening the exposure time if the subject is dark has been used.

In the imaging by this prolonged exposure, an imaging device which performs exposure multiple times in a predetermined short exposure time and adds image signals obtained in each exposure, thereby obtaining an image of prolonged exposure in which an S/N (Signal-to-Noise ratio), which represents the amount of noise to a signal, is high is disclosed (refer to Japanese Unexamined Patent Application, First Publication No. 2003-69897).

Additionally, the above publication discloses displaying an image during the prolonged exposure, which is obtained by adding respective image signals obtained in a short exposure time while performing the prolonged exposure, on a display device provided in the imaging device, thereby confirming whether or not the image obtained during the prolonged exposure (the image data which will finally be recorded) is an image that the user of the imaging device wants to obtain.

FIG. 6 is a block diagram showing a schematic configuration of a related imaging device disclosed in the above publication.

In FIG. 6, the imaging device 500 includes a lens group 511, a solid-state imaging element 512, an imaging circuit 513, an A/D converter 514, a lenses driving circuit 515, a detachable memory 520, an image processing circuit 521, an compression/expansion unit 522, a built-in memory 525, an LCD (Liquid Crystal Display) 530 for image display, an LCD driver 531, a system controller 540, a nonvolatile memory 541, and an operation unit 546.

When an image is taken by the imaging device 500, first, an optical image of a subject which has passed through the lens group 511 is formed on the solid-state imaging elements 512, such as a CCD or CMOS image sensor. After that, the optical image formed by the solid-state imaging elements 512 is converted into electrical signals (hereinafter referred to as "pixel signals") according to the quantity of incident light and the converted signals are output to the imaging circuit 513.

Subsequently, the imaging circuit 513 converts the pixel signals input from the solid-state imaging element 512 into analog image signals of the subject, and outputs the converted signals to the A/D (Analog to Digital) converter 514 at the subsequent stage.

Subsequently, the A/D converter 514 converts the analog image signals into digital image signals (hereinafter referred to as "image information") in an analog-to-digital manner, and temporarily stores the converted signals in the built-in memory 525. For example, an SDRAM (Synchronous Dynamic Random Access Memory), or the like is used for the built-in memory 525, and is a high-speed nonvolatile temporary storage memory utilized also by the image processing circuit 521 which will be described later.

The image processing circuit 521 creates image data by performing conversion processing of color information, conversion processing of the number of pixels, or the like on the image information temporarily stored in the built-in memory 525, and outputs this created image data to the compression/expansion unit 522.

The compression/expansion unit 522 creates compressed image data by compressing the image data processed by the image processing circuit 521 by using, for example, a JPEG (Joint Photographic Experts Group) compression technique, or the like, and records this compressed image data on the detachable memory 520, such as a memory card.

Additionally, when an image picked up by the imaging device 500 is displayed, image processing required for display is performed on the image data processed by the image processing circuit 521, and then, the image data is displayed on the LCD 530 for image display via the LCD driver 531. Additionally, when the image information recorded on the detachable memory 520 is displayed on the LCD 530 for image display, first, the compressed image data stored in the detachable memory 520 is read and is expanded by the compression/expansion unit 522, that is, the same image data as the image data processed by the image processing circuit 521 is created. Thereafter, the image data is subjected to the image processing required for display by the image processing circuit 521, and is then displayed on the LCD 530 for image display via the LCD driver 531 similarly to a case where the image picked up by the imaging device 500 is displayed.

The system controller 540 controls the operation of the imaging device 500 according to input from a release button or arrow key (not shown) which is operated by a user of the imaging device 500. Additionally, the system controller 540 controls the driving of the lens group 511 via a lenses driving circuit 515.

In the above-described configuration in the above publication, the respective image information obtained by multiple exposures is temporarily stored in the built-in memory 525, the respective image information temporarily stored in the built-in memory 525 is added, and the added image information is displayed on the LCD 530 for image display.

Additionally, in the above publication, two methods are disclosed as the method of adding the image information obtained by multiple exposures, and obtaining an image of prolonged exposure with high S/N. FIGS. 7A and 7B are block diagrams showing a schematic configuration which adds image information in the related imaging device.

The first method, as shown in FIG. 7A, is a method which includes a plurality of built-in memories 525, and which, when each piece of image information is temporarily stored in each built-in memory 525 and displayed on the LCD 530 for image display, reads the image information from each built-in memory 525 to add the image information by an adder 526.

The second method, as shown in FIG. 7B, is a method which includes one built-in memory 525 and which adds image information temporarily stored up to the last time by an adder 526 before the image information is temporarily stored, and repeats the operation of temporarily storing the added image information as new image information.

FIG. 8 is a drawing showing the relationship among the exposure timing, the signal level and noise level of an obtained image, and the display, in a prolonged exposure operation of the imaging device of the above publication. An example where, when imaging by prolonged exposure is performed, exposure is performed four times in a shorter exposure time than the time of prolonged exposure, and the obtained four images are added is shown in FIG. 8.

In FIG. 8, when a shutter is brought into an "open" state, first, exposure 1 is started and imaging of a subject is performed. If the predetermined exposure time has passed, once the exposure is completed, the image information 1 obtained by the exposure 1 is read. The read image information 1 is subjected to image processing, and image data 1 is created.

Subsequently, the reading of the image information 1, while next exposure 2 is started simultaneously, and imaging of the subject is continued. If the predetermined exposure time has passed, the exposure is completed, image data 2, which is subjected to image processing similarly to the operation of the exposure 1 and is added to the image data 1 created by the operation of the previous exposure 1, is created. In the created image data 2, the signal level of the image data is doubled.

Similarly, as image data 3 and image data 4 are added, the signal level of image data is increased to a multiple of the number of image data added. This makes it possible to obtain a proper amount of exposure (the signal level of image data) even when the subject is dark.

Additionally, in the imaging device of the above publication, the image data picked up during prolonged exposure, i.e., during a period in a state where the shutter is in an "open" state, is displayed by performing the image processing required for display after the image data is created. In the example of FIG. 8, the image data 1 to the image data 3 before the image data 4 that is the final image data obtained by adding four kinds of image data are displayed.

That is, it is possible to display image data of the number of times of display during prolonged exposure, which is obtained by subtracting 1 from the number of image data.

SUMMARY OF THE INVENTION

In one aspect of the present invention, there is provided an imaging device that includes at least a pixel array in which a plurality of pixels including a first pixel and a second pixel, which have a photoelectric conversion elements and which output pixel signals according to the quantities of incident light to the photoelectric conversion elements, are arranged in two dimensions, a reading unit which reads a first pixel signal from the first pixel and reads a second pixel signal from the second pixel, a pixel signal addition unit which adds the first pixel signal read from the first pixel with a plurality of different timings and adds the second pixel signal read from the second pixel with a plurality of different timings, and a display unit which displays the first pixel signal added by the pixel signal addition unit and the second pixel signal added by the pixel signal addition unit sequentially with different timings.

Moreover, it is preferable that in the imaging device, the reading unit may perform the reading of the first pixel signal and the reading of the second pixel signal alternately.

Furthermore, it is preferable that in the pixel array, the first and second pixels comprising the photoelectric conversion elements which are arranged in a row direction may be alternately arranged in a column direction.

Additionally, it is preferable that in the pixel array, the first and second pixels comprising the photoelectric conversion elements which are arranged in a column direction may be alternately arranged in a row direction.

In addition, it is preferable that in the pixel signal addition unit, the number of times for adding the read first pixel signal and the number of times for adding the read second pixel signal may be the same number of times.

Besides, it is preferable that the exposure of the first pixel and the exposure of the second pixel may be performed on the same subject.

BRIEF DESCRIPTION OF THE DRAWINGS

The above features and advantages of the present invention will be more apparent from the following detailed description of certain preferred embodiments taken in conjunction with the accompanying drawings, in which:

FIG. 3 is a drawing showing an example of the relationship among the exposure timing, the signal level and noise level of an obtained image, and the display, in a prolonged exposure operation of the imaging device of this embodiment;

FIG. 4 is a drawing showing an example of the relationship among the exposure timing, the signal level and noise level of an obtained image, and the display, in a prolonged exposure operation of the imaging device of this embodiment;

FIG. 8 is a drawing showing the relationship among the exposure timing, the signal level and noise level of an obtained image, and the display, in a prolonged exposure operation of the related imaging device.

DETAILED DESCRIPTION OF THE PREFERRED EMBODIMENTS

The present invention will be described below referring to concrete embodiments. Those skilled in the art will be able to implement various different embodiments based on the description of the present invention, and the invention is not limited to the embodiments illustrated for description.

Figure 1:
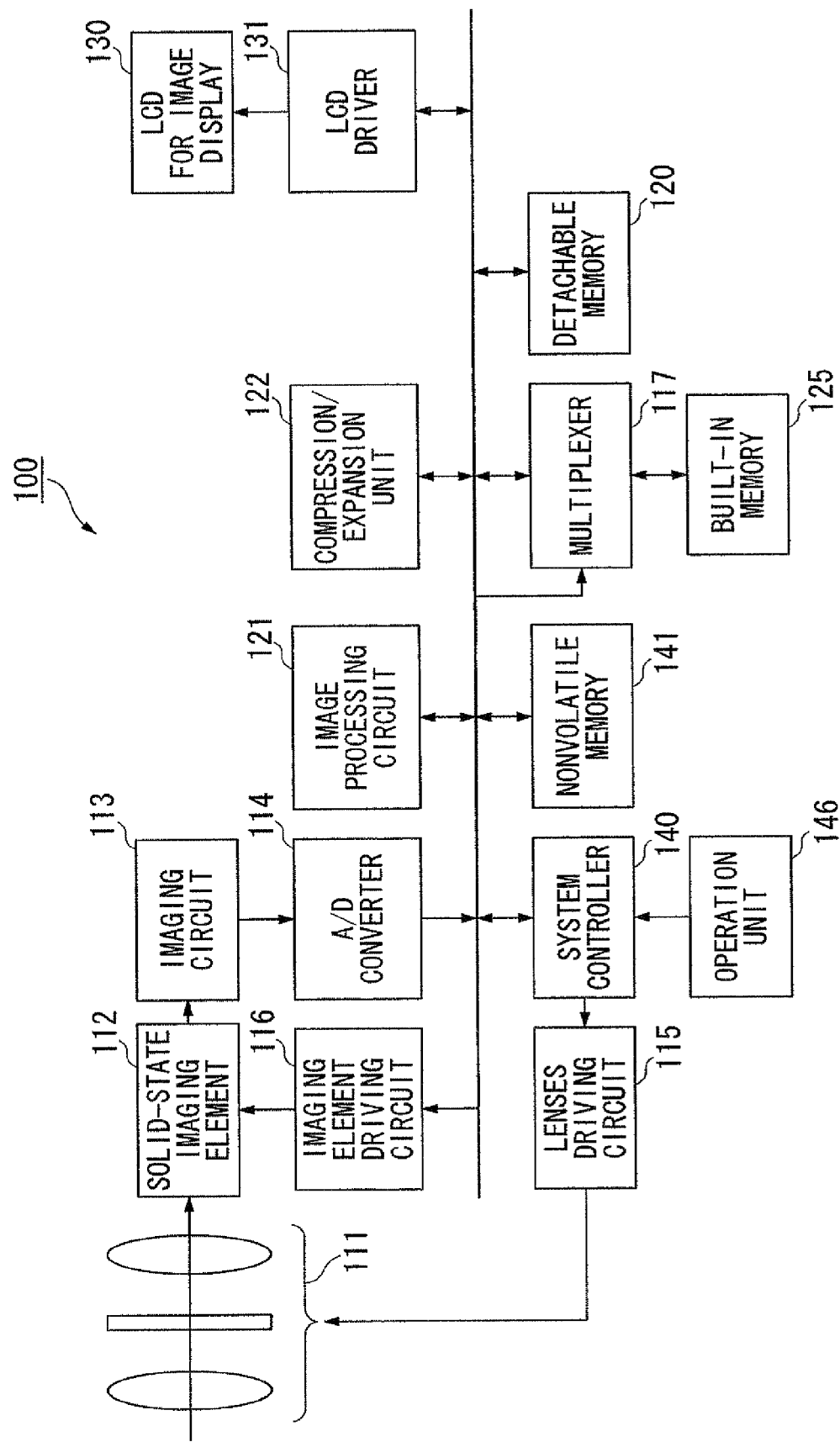
FIG. 1 is a block diagram showing a schematic configuration of an imaging device according to an embodiment of the present invention.

The embodiments of the present invention will be described below with reference to the drawings. FIG. 1 is a block diagram showing a schematic configuration of an imaging device according to this embodiment. In FIG. 1, the imaging device 100 includes a lens group 111, a solid-state imaging element 112, an imaging circuit 113, an A/D converter 114, a lenses driving circuit 115, an imaging element driving circuit 116, a multiplexer 117, a detachable memory 120, an image processing circuit 121, an compression/expansion unit 122, an built-in memory 125, an LCD 130 for image display, an LCD driver 131, a system controller 140, a nonvolatile memory 141, and an operation unit 146.

The lens group 111 includes a plurality of optical lenses which forms an optical image of a subject on the solid-state imaging element 112.

The lenses driving circuit 115 is controlled by the system controller 140, and drives, for example, a focus lens, or the like for focusing the lens group 111.

The solid-state imaging element 112 is a photoelectric conversion element which forms the optical image of the subject which has passed through the lens group 111, and outputs pixel signals according to the quantity of exposed incident light to the imaging circuit 113.

The imaging circuit 113 converts the pixel signals input from the solid-state imaging element 112 into analog image signals of the subject based on the number of pixels of the solid-state imaging element 112, and outputs the converted signals to the A/D converter 114.

The A/D converter 114 converts the analog image signals input from the imaging circuit 113 into digital image signals in an analog-to-digital manner, and temporarily stores the converted signals in the built-in memory 125 via the multiplexer 117.

The built-in memory 125 is, for example, a high-speed nonvolatile semiconductor memory, such as an SDRAM, and temporarily stores digital data created by each process in the imaging device 100 of this embodiment.

The image processing circuit 121 performs, for example, color information conversion processing on the digital image signals stored temporarily in the built-in memory 125 to convert the digital image signals into the image data of the subject picked up by the imaging device 100, and temporarily stores the image data in the built-in memory 125 again. Additionally, the image processing circuit 121 performs, for example, number-of-pixels conversion processing on the image data temporarily stored on the built-in memory 125 to convert the image data into display data to be displayed on the LCD 130 for image display, and outputs the display data to the LCD driver 131.

The compression/expansion unit 122 creates compressed image data by compressing the image data temporarily stored in the built-in memory 125 by using, for example, a JPEG compression technique, or the like, and records this compressed image data on the detachable memory 120, such as a detachable memory card.

The detachable memory 120 is, for example, a detachable memory, such as smart media, and provides a user of the imaging device 100 with the image data picked up by the imaging device 100.

The LCD driver 131 converts the display data created by the image processing circuit 121 into an input form of the LCD 130 for image display.

The LCD 130 for image display is a display device which displays the display data converted into the input form by the LCD driver 131.

The system controller 140 is a processor which controls the whole imaging device 100 according to operation of the imaging device 100 by the user, such as a CPU (Central Processing Unit).

The nonvolatile memory 141 is, for example, a rewritable semiconductor memory, such as a flash ROM, in which a program of the imaging device 100 to be executed by the system controller 140 is stored.

The operation unit 146 transmits to the system controller 140 input from an operating device, such as a release button or arrow key (not shown), which is operated by the user of the imaging device 100, i.e., the content of the operation of the user of the imaging device 100.

The imaging element driving circuit 116 outputs control signals for reading the pixel signals from the solid-state imaging element 112. The imaging element driving circuit 116 outputs driving signals for reading all the pixels to the solid-state imaging element 112, for example, when all the pixel signals of the solid-state imaging element 112 are read, and outputs driving signals for thinning-out and reading to the solid-state imaging element 112 when the pixel signals of the solid-state imaging element 112 are thinned out and read.

The multiplexer 117 controls a memory region of the built-in memory 125 which is used when the digital image signals converted by the processing of the imaging circuit 113 and the A/D converter 114 from the pixel signals read by the control of the imaging element driving circuit 116 are temporarily stored in the built-in memory 125. The multiplexer 117 also performs the control when the digital image signals temporarily stored in the built-in memory 125 are read.

In addition, the memory region of the built-in memory 125 according to the multiplexer 117 is controlled according to a reading method of the solid-state imaging element 112 performed by the imaging element driving circuit 116.

Figure 6:
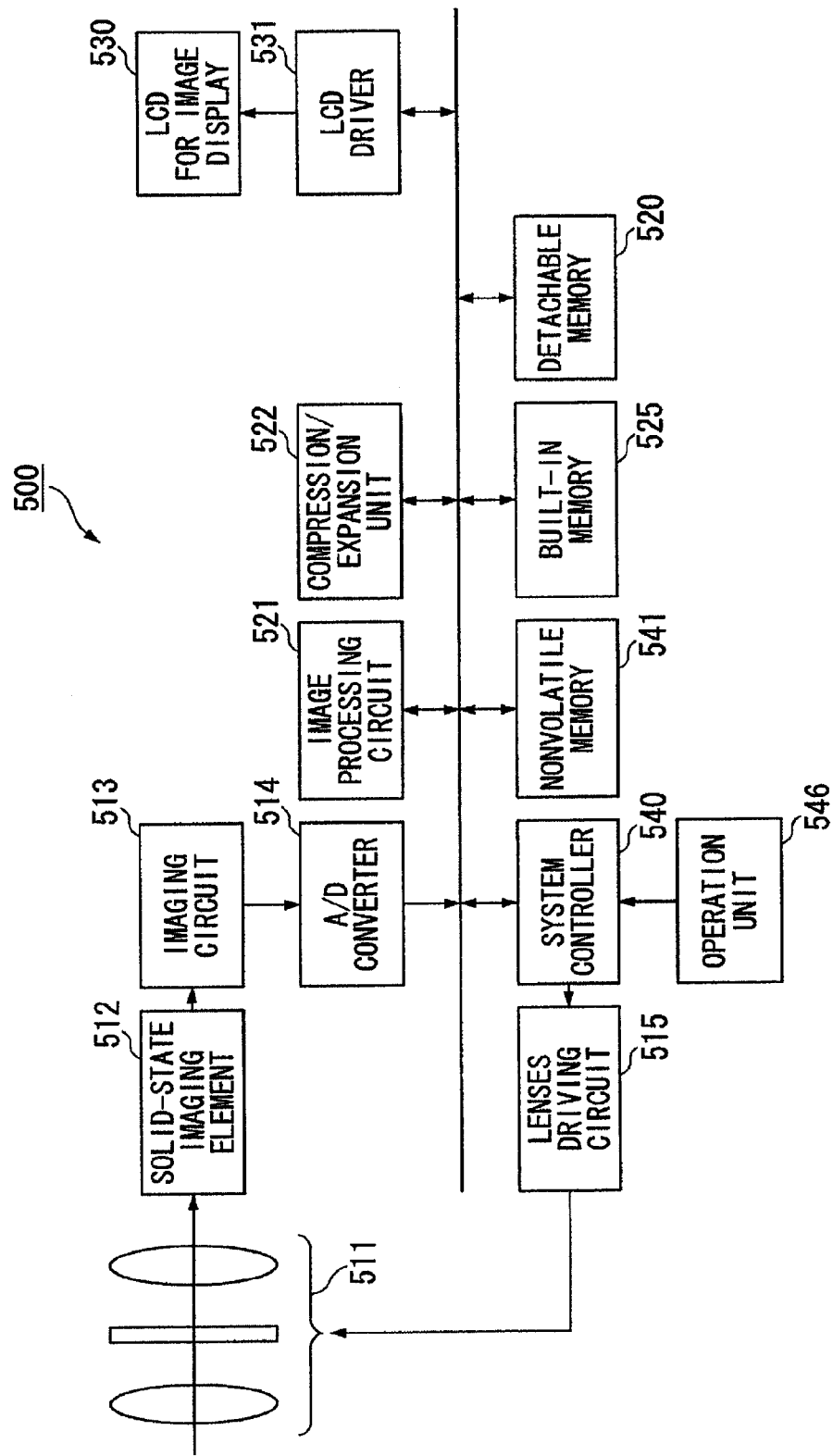
FIG. 6 is a block diagram showing a schematic configuration of a related imaging device.

Since a case where normal imaging is performed by the imaging device 100 employs the same method as the imaging method by the conventional imaging device 500 shown in FIG. 6, the description thereof is omitted.

A case where imaging by prolonged exposure is performed by the imaging device 100 will be described. In addition, the case will be described where a solid-state imaging element of a type in which photoelectric conversion element groups arranged in a row direction or a column direction are alternately arranged in the column direction or the row direction is used as the solid-state imaging element 112 in this embodiment, and the imaging element driving circuit 116 controls the reading of an odd-line region composed of odd-row or odd-column photoelectric conversion element groups of the solid-state imaging element 112, and an even-line region composed of even-row or even-column photoelectric conversion element groups. Additionally, the case where an image region (resolution) which can be displayed by the LCD 130 for image display is smaller than the number of pixels of the solid-state imaging element 112 will be described.

When the prolonged exposure by the imaging device 100 is performed, the imaging element driving circuit 116 performs the reading of the pixel signals from the solid-state imaging element 112 two or more times at predetermined short intervals of exposure time.

At this time, as for the reading of the pixel signals by the imaging element driving circuit 116, the reading of the odd-line region and the reading of the even-line region of the solid-state imaging element 112 are alternately performed.

Respective pixel signals obtained by each reading are converted into analog image signals by the imaging circuit 113 for every read pixel signal, are subsequently converted into digital image signals by the A/D converter 114, and are temporarily stored in the built-in memory 125 via the multiplexer 117 for every digital image signal.

When an image during the prolonged exposure by the imaging device 100 is displayed on the LCD 130 for image display, the image processing circuit 121 reads a new digital image signal of the same region temporarily stored in the built-in memory 125, and the digital image signals up to the last time of the same region from the built-in memory 125 via the multiplexer 117, whenever the new digital image signal of the same region is stored in the built-in memory 125.

The image processing circuit 121 adds all the digital image signals of the same region read from the built-in memory 125, then performs the image processing required for display on the added-up digital image signals, and then displays the processed signals on the LCD 130 for image display via the LCD driver 131.

That is, when the reading of pixel signals of the odd-line region is first performed, and the reading of pixel signals of the even-line region is then performed, the image processing circuit 121 reads digital image signals of the odd-line region, which are first obtained, from the built-in memory 125 via the multiplexer 117, performs the image processing required for display, and then displays the processed signals on the LCD 130 for image display via the LCD driver 131. In addition, since the digital image signals of the odd-line region from a previous time do not exist in the first display where the prolonged exposure has been started, the addition of the digital image signals is not performed.

Subsequently, the image processing circuit 121 reads the digital image signals of the even-line region, which are obtained next, from the built-in memory 125 via the multiplexer 117, then performs the image processing required for display, and then displays processed signals on the LCD 130 for image display via the LCD driver 131. In addition, since the digital image signals of the even-line region from a previous time do not exist in the first display where the prolonged exposure has been started, the addition of the digital image signals is not performed.

Next, when the second reading of pixel signals of the odd-line region is performed, and the reading of pixel signals of the even-line region is then performed, the image processing circuit reads second digital image signals of the odd-line region, and first digital image signals of the odd-line region from the built-in memory 125 via the multiplexer 117, adds the read digital image signals of the odd-line region, performs the image processing required for display, and then displays the processed signals on the LCD 130 for image display via the LCD driver 131.

Subsequently, the image processing circuit reads second digital image signals of the even-line region and first digital image signals of the even-line region from the built-in memory 125 via the multiplexer 117, adds the digital image signals of the read even-line region, then performs the image processing required for display, and then displays processed signals on the LCD 130 for image display via the LCD driver 131.

Henceforth, by repeating the addition and display of digital image signals including a new digital image signal of the same region and the digital image signals of the same region up to the previous time, whenever new digital image signals are obtained by a plurality of exposures, the user of the imaging device 100 can confirm an image during prolonged exposure.

When final image data obtained by prolonged exposure is recorded on the detachable memory 120 after a prolonged exposure by the imaging device 100 has ended, first, the image processing circuit 121 reads all the digital image signals temporarily stored in the built-in memory 125 from the built-in memory 125 via the multiplexer 117.

The image processing circuit 121 adds all the digital image signals read from the built-in memory 125, creates the image data after the conversion processing of the color information, the conversion processing of the number of pixels, or the like which are required in recording are performed, and outputs the created image data to the compression/expansion unit 122.

The compression/expansion unit 122 performs compression processing on the image data input from the image processing circuit 121 to create compressed image data, and records this compressed image data on the detachable memory 120.

Figure 2A:
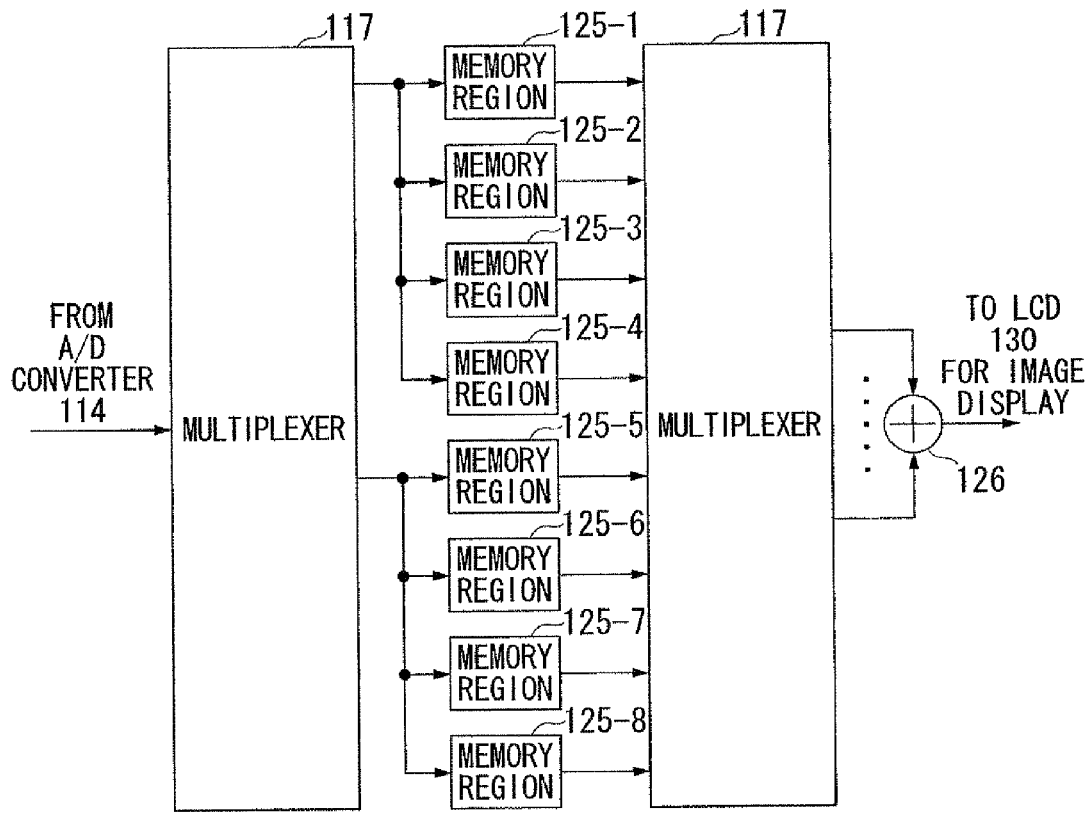
FIGS. 2A and 2B are block diagrams showing a schematic configuration related to the flow of digital image signals in the imaging device of this embodiment.
Figure 2B:
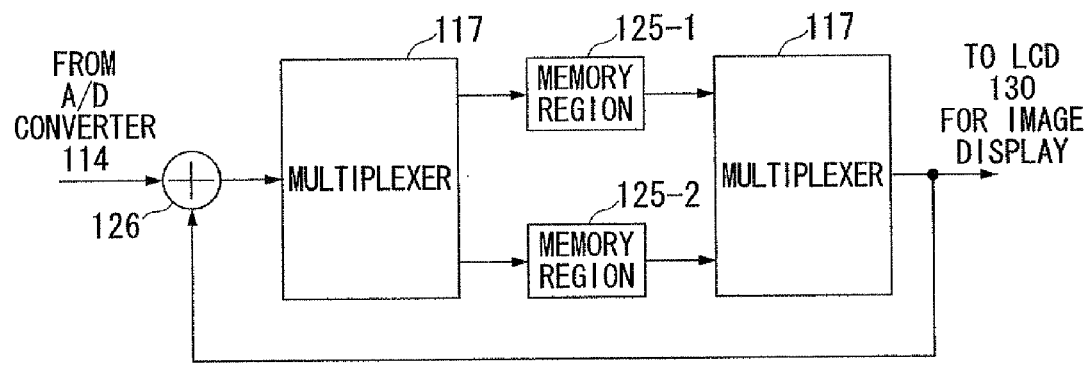

Next, a method of temporarily storing digital image signals, and adding the temporarily stored digital image signals in a case where prolonged exposure is performed in the imaging device 100 of this embodiment will be described. FIGS. 2A and 2B are block diagrams showing a schematic configuration related to the flow of digital image signals in the imaging device 100 according to this embodiment. As shown in FIGS. 2A and 2B, there are two kinds of methods as the method of, in prolonged exposure, temporarily storing digital image signals, which are obtained at predetermined short intervals of exposure time, in the built-in memory 125, and adding the digital image signals which are temporarily stored in the built-in memory 125. In addition, in FIGS. 2A and 2B, the built-in memory is composed of a plurality of memory regions 125-1 to 125-8. Here, a figure following "-(hyphen)" after the reference numeral of the built-in memory 125 represents the number of a memory region in the built-in memory 125.

The method shown in FIG. 2A prepares a plurality of memory regions in the built-in memory 125 which temporarily stores digital image signals obtained in each short exposure time, and temporarily stores the digital image signals in each memory region.

In addition, as shown in FIG. 2A, as paths of the digital image signals output from the multiplexer 117, two lines, for example, memory regions (memory regions 125-1 to 125-4) for digital image signals of the odd-line region and memory regions (memory regions 125-5 to 125-8) for digital image signals of the even-line region can also be prepared.

The image processing circuit 121 reads digital image signals of respective memory regions of the same region when digital image signals in a memory region, for example, in the odd-line region where digital image signals are temporarily stored, are temporarily stored in a memory region 125-1 and digital image signals of the even-line region are temporarily stored in a memory region 125-5, adds the digital image signals by an adder 126, then performs the image processing required for display, and displays the processed signals on the LCD 130 for image display via the LCD driver 131.

In the method shown in FIG. 2A, when final image data obtained by prolonged exposure is recorded on the detachable memory 120 after the prolonged exposure by the imaging device 100 is ended, the image processing circuit reads digital image signals of all the memory regions where digital image signals of the odd-line region and digital image signals of the even-line region are stored, adds the digital image signals by the adder 126, creates the image data after the image processing required in recording is performed, and performs compression processing on the created image data to record the compressed image data on the detachable memory 120.

The method shown in FIG. 2B prepares only a memory region, which temporarily stores one digital image signal, in the built-in memory 125 which temporarily stores digital image signals obtained in each short exposure time, adds-up new digital image signals and the digital image signals up to the previous time whenever the new digital image signal is input, and temporarily stores the added-up signal in one memory region. In addition, as shown in FIG. 2B, as paths of the digital image signals output from the multiplexer 117, two lines, for example, a memory region (a memory region 125-1) for digital image signals of the odd-line region and a memory region (a memory region 125-2) for digital image signals of the even-line region can also be prepared.

The image processing circuit 121 reads the memory region 125-1 where digital image signals of the odd-line region up to the previous time are temporarily stored, for example, when digital image signals of the odd-line region are temporarily stored in the memory region 125-1 and digital image signals of the even-line region are temporarily stored in a memory region 125-2, and digital image signals of the odd-line region are input next, performs addition with the new digital image signals of the odd-line region input by the adder 126, and then temporarily stores the processed signals in the memory region 125-1 again. Thereafter, the image processing required for display is performed to display the processed signals on the LCD 130 for image display via the LCD driver 131.

In the method shown in FIG. 2B, when final image data obtained by prolonged exposure is recorded on the detachable memory 120 after the prolonged exposure by the imaging device 100 is ended, the image processing circuit reads digital image signals of the two memory regions where digital image signals of an odd-line region and digital image signals of an even-line region are stored, adds the digital image signals of the odd-line region and the digital image signals of the even-line region by an adder (not shown), creates the image data after the image processing required in recording is performed, and performs compression processing on the created image data to record the compressed image data on the detachable memory 120.

First Embodiment

Next, detailed processing in the case where prolonged exposure is performed in the imaging device 100 of this embodiment will be described. FIG. 3 is a drawing showing an example of the relationship among the exposure timing, the signal level and noise level of an obtained image, and the display, in a prolonged exposure operation of the imaging device 100 according to this embodiment. In addition, the example shown in FIG. 3 is an example where, when imaging by prolonged exposure is performed, exposure is performed three times in a shorter exposure time than the time of prolonged exposure, and the noise level of the final image data obtained by the prolonged exposure is reduced compared to that conventionally obtained, that is, a decrease in S/N is suppressed.

Additionally, a case will be described where a solid-state imaging element of a type in which photoelectric conversion element groups arranged in a row direction are alternately arranged in the column direction is used as the solid-state imaging element 112 in this embodiment, and the imaging element driving circuit 116 controls the reading of an odd-line region composed of odd-row photoelectric conversion element groups of the solid-state imaging element 112, and an even-line region composed of even-row photoelectric conversion element groups. Additionally, a case where image regions (resolution) which can be displayed by the LCD 130 for image display are smaller than the number of pixels of the solid-state imaging element 112 will be described. Additionally, a case will be described where memory regions controlled by the multiplexer 117 are configured by preparing a plurality of memory regions in the built-in memory 125 as shown in FIG. 2A, the memory regions are enough to perform exposure three times on the odd-line region and the even-line region, respectively, i.e., to perform exposure three times on two kinds of memory regions composed of an odd-line region and an even-line region, and six regions are secured in each of the memory regions.

First, if a shutter of the imaging device 100 is brought into an open state, the imaging element 112 forms an optical image of a subject which has passed through the lens group 111. That is, exposure of the odd-line region and exposure of the even-line region are simultaneously started.

Subsequently, the imaging element driving circuit 116 reads pixel signals 1o of the odd-line region of the solid-state imaging element 112 after the predetermined first exposure time (exposure 1o) of the odd-line region has passed. In addition, if the reading of photoelectric conversion element groups of the odd-line region where reading has been performed is started, that is, after the pixel signals 1o of the odd-line region obtained by the first exposure are transferred to a transmission path (not shown) in the solid-state imaging element 112, second exposure 2o is started.

The pixel signals 1o of the odd-line region obtained by the first exposure 1o are converted into digital image signals (hereinafter referred to as an "odd frame") 1 including the image information 1o and random noise of the odd-line region by the imaging circuit 113 and the A/D converter 114, and the odd frame 1 is temporarily stored in the memory region 125-1 via the multiplexer 117. Thereafter, the image processing circuit 121 reads the odd frame 1 temporarily stored in the memory region 125-1 via the multiplexer 117, and performs the image processing required for display, on the read odd frame 1. The display data 1 on which image processing for display has been performed is displayed on the LCD 130 for image display via the LCD driver 131. This enables the user of the imaging device 100 to confirm an image during prolonged exposure.

The image processing for display is, for example, processing which thins out data from an odd frame according to a resolution such that the LCD 130 for image display can display. More specifically, supposing the number of pixels that the LCD 130 for image display can display is ⅛ of the number of pixels of the solid-state imaging element 112, since the data of the odd frame 1 in a transverse direction (horizontal direction) is constituted by pixel signals of all photoelectric conversion elements of the solid-state imaging element 112 in the transverse direction (horizontal direction), thinning-out processing is performed up to ⅛ pixel signals. On the other hand, since the data of the odd frame 1 in the longitudinal direction (vertical direction) is constituted by pixel signals of only the odd-line region by the imaging element driving circuit 116, i.e., ½ pixel signals of the solid-state imaging element 112 in the longitudinal direction (vertical direction), with respect to pixel signals of all photoelectric conversion elements of the solid-state imaging element 112 in the longitudinal direction (vertical direction), thinning-out processing is performed up to ¼ pixel signals, whereby the processing is finally equivalent to performing thinning-out up to ⅛ pixel signals.

In addition, the image processing for display is not specified in the present invention.

Subsequently, the imaging element driving circuit 116 reads pixel signals 1e of the even-line region of the solid-state imaging element 112 after the predetermined first exposure time (exposure 1e) of the even-line region has passed. In addition, if the reading of photoelectric conversion element groups of the even-line region where reading has been performed is started, that is, after the pixel signals 1e of the even-line region obtained by the first exposure are transferred to a transmission path (not shown) in the solid-state imaging element 112, second exposure 2e is started.

The pixel signals 1e of the even-line region obtained by the first exposure 1e are converted into digital image signals (hereinafter referred to as an "even frame") 1 including the image information 1e and random noise of the even-line region by the imaging circuit 113 and the A/D converter 114, and the even frame 1 is temporarily stored in the memory region 125-5, which is a memory region different from the memory region 125-1 in the built-in memory 125, in which the odd frame 1 is temporarily stored, via the multiplexer 117. That is, the odd frame 1 and the even frame 2 are treated as different kinds of image information. Thereafter, the image processing circuit 121 reads the even frame 1 temporarily stored in the memory region 125-5 via the multiplexer 117, and performs the image processing required for display on the read even frame 1. The display data 2 on which image processing for display has been performed is displayed on the LCD 130 for image display via the LCD driver 131.

In addition, as for the image processing for display on the even frame 1, the data of the even frame 1 in the transverse direction (horizontal direction) can be processed similarly to the image processing for display on the odd frame 1 described above. However, if the data of the even frame 1 in the longitudinal direction (vertical direction) is processed similarly to the image processing for display on the odd frame 1 described above, there is a possibility that the data may move (may deviate) in the longitudinal direction (vertical direction) when being displayed on the LCD 130 for image display. It is necessary to use a method different from the thinning-out processing on the odd frame 1 described above as thinning-out processing so that such a phenomenon does not occur. In the present invention, however, the image processing for display on the even frame 1 is not specified.

Subsequently, the imaging device driving circuit 116 reads pixel signals 2o of the odd-line region of the solid-state imaging device 112 after the predetermined second exposure time (exposure 2o) of the odd-line region has passed. In addition, similarly to the above description, third exposure 3o is started in the photoelectric conversion element groups of the odd-line region where reading has been performed.

The pixel signals 2o of the odd-line region obtained by the second exposure 2o are converted into the odd frame 2 by the imaging circuit 113 and the A/D converter 114, and the odd frame 2 is temporarily stored in the memory region 125-2, which is a memory region different from the memory region 125-1 in the built-in memory 125, in which the odd frame 1 is temporarily stored, and the memory region 125-5 in which the even frame 1 is temporarily stored, via the multiplexer 117. Thereafter, the image processing circuit 121 reads the odd frame 1 temporarily stored in the memory region 125-1 and the odd frame 2 temporarily stored in the memory region 125-2 via the multiplexer 117. The image processing circuit 121 creates digital image signals (hereinafter referred to an "odd image frame") 1 obtained by adding the read odd frame 1 and odd frame 2, and performs the image processing required for display on the odd image frame 1 similarly to the processing of the odd frame 1 described above. The display data 3 on which image processing for display has been performed is displayed on the LCD 130 for image display via the LCD driver 131.

Subsequently, when the shutter is closed, the imaging element driving circuit 116 reads pixel signals 2e of the even-line region of the solid-state imaging element 112 which are exposed during the second exposure time (exposure 2e) of the even-line region, which has been performed until the closing of the shutter. In addition, since the shutter is closed, but the exposure 3o of the odd-line region is already started, in order to match the number of exposures, a third exposure is performed in the photoelectric conversion element groups of the even-line region where readings have been performed similarly to the above description. The third exposure performed in order to match this number of exposures is a dummy exposure since the shutter has already been closed.

The pixel signals 2e of the even-line region obtained by the second exposure 2e are converted into the even frame 2 by the imaging circuit 113 and the A/D converter 114, and the even frame 2 is temporarily stored in the memory region 125-6, which is a memory region different from the memory region 125-1 in the built-in memory 125, in which the odd frame 1 is temporarily stored, the memory region 125-5 in which the even frame 1 is temporarily stored, and the memory region 125-2 in which the odd frame 2 is temporarily stored, via the multiplexer 117.

Subsequently, the imaging element driving circuit 116 reads pixel signals 3o of the odd-line region of the solid-state imaging element 112 after a predetermined third exposure time (exposure 3o) of the odd-line region has passed. In addition, the exposure of the photoelectric conversion element groups of the odd-line region is ended, and subsequent exposure is not performed.

The pixel signals 3o of the odd-line region obtained by the third exposure 3o are converted into the odd frame 3 by the imaging circuit 113 and the A/D converter 114, and the odd frame 3 is temporarily stored in the memory region 125-3, which is a memory region different from the memory regions in the built-in memory 125 used for storage up to the previous time, via the multiplexer 117.

Subsequently, the imaging element driving circuit 116 reads pixel signals 3e of the even-line region of the solid-state imaging element 112 exposed by the dummy exposure of the even-line region. In addition, the exposure of the photoelectric conversion element groups of the even-line region is ended, and subsequent exposure is not performed.

The pixel signals 3e of the even-line region obtained by the dummy exposure are converted into the even frame 3 by the imaging circuit 113 and the A/D converter 114, and the even frame 3 is temporarily stored in the memory region 125-7, which is a memory region different from the memory regions in the built-in memory 125 used for storage up to the previous time, via the multiplexer 117.

In addition, since the pixel signals 2e of the even-line region obtained by the second exposure 2e, the pixel signals 3o of the odd-line region obtained by the third exposure 3o, and the pixel signals 3e of the even-line region obtained by the dummy exposure are read by the imaging element driving circuit 116 after the shutter is closed, the pixel signals are not used as the data to be displayed on the LCD 130 for image display, and are used only for the creation of final image data obtained by prolonged exposure.

Additionally, when final image data obtained by prolonged exposure is recorded on the detachable memory 120 after the prolonged exposure by the imaging device 100 is ended, the image processing circuit reads all the digital image signals (the odd frames 1 to 3 and the even frames 1 to 3) which are temporarily stored, and adds all the read digital image signals. The image processing required in recording is performed on the final digital image signals obtained by adding all the digital image signals to create final image data, and the created image data is compressed and recorded on the detachable memory 120.

Next, the S/N of the final image data obtained by prolonged exposure in the first embodiment will be described.

A random noise in one reading of pixels is expressed by following Expression (1).

$$VRN(N) = \sqrt{N} \times VRN \qquad (1)$$

Since exposure is performed three times in the first embodiment, both the photoelectric conversion element groups of the odd-line region and the photoelectric conversion element groups of the even-line region have three readings.

Accordingly, if this number of readings (three times) is applied to Expression (1), the random noise VRN (3) and the S/N become like following Expression (2) and Expression (3), respectively.

$$VRN(3) = \sqrt{3} \times VRN = 1.73 \times VRN \qquad (2)$$

$$S/N = VSIG/VRN(3) = (VSIG/VRN) \times (1/1.73) \qquad (3)$$

Here, a finally obtained signal level is defined as VSIG, and the S/N when multiple readings are not performed is defined as VSIG/VRN.

Figure 7A:
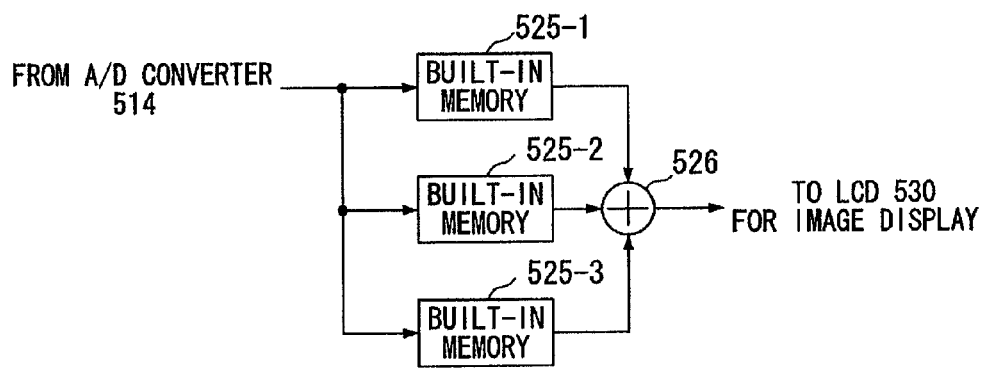
FIGS. 7A and 7B are block diagrams showing a schematic configuration which adds image information in the related imaging device.
Figure 7B:
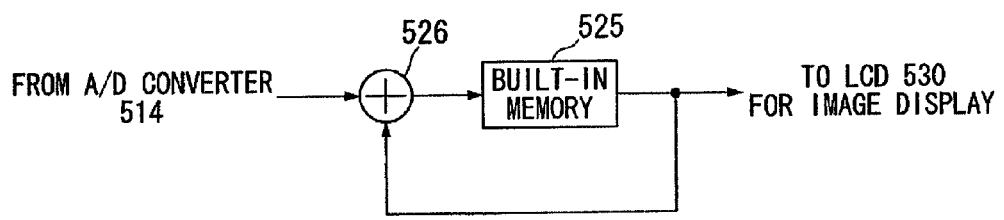

As described above, according to the first embodiment of the present invention, even when the updated number of times of an image to be displayed on the LCD 130 for image display during prolonged exposure is made to be equal to the number of times in the conventional method shown in FIGS. 7A and 7B, by dividing the solid-state imaging element 112 into an odd-line region and an even-line region, and performing reading for every region, the noise level of the final image data obtained by prolonged exposure can be reduced compared to that conventionally obtained, and a decrease in S/N can be suppressed.

Second Embodiment

Next, another processing in the case where prolonged exposure is performed in the imaging device 100 of this embodiment will be described. FIG. 4 is a drawing showing an example of the relationship among the exposure timing, the signal level and noise level of an obtained image, and the display, in a prolonged exposure operation of the imaging device 100 according to this embodiment. In addition, the example shown in FIG. 4 is an example where, when imaging by prolonged exposure is performed, exposure is performed four times in a shorter exposure time than the time of prolonged exposure. Also, when the S/N, i.e., noise level of the final image data obtained by prolonged exposure is made to equal to that conventionally obtained, the updated number of times of an image to be displayed on the LCD 130 for image display during prolonged exposure is increased compared to the conventional number.

Additionally, a case will be described where a solid-state imaging element of a type in which photoelectric conversion element groups arranged in a row direction are alternately arranged in the column direction is used similarly to the first embodiment as the solid-state imaging element 112 in this embodiment, and the imaging element driving circuit 116 controls the reading of an odd-line region composed of odd-row photoelectric conversion element groups of the solid-state imaging element 112, and an even-line region composed of even-row photoelectric conversion element groups. Additionally, image regions (resolution) which can be displayed by the LCD 130 for image display, and memory regions controlled by the multiplexer 117 are the same as those of the first embodiment. However, since the memory regions temporarily store digital image signals obtained by performing exposure four times on two kinds of memory regions composed of an odd-line region and an even-line region as the number of exposures increases to four times, a case where eight memory regions are secured will be described.

First, if a shutter of the imaging device 100 is brought into an open state, the imaging element 112 forms an optical image of a subject which has passed through the lens group 111. That is, exposure of the odd-line region and exposure of the even-line region are simultaneously started.

Subsequently, the imaging element driving circuit 116 reads pixel signals 1*o* of the odd-line region of the solid-state imaging element 112 after the predetermined first exposure time (exposure 1*o*) of the odd-line region has passed. In addition, similarly to the first embodiment, the second exposure 2*o* is started in the photoelectric conversion element groups of the odd-line region where reading has been performed.

The pixel signals 1*o* of the odd-line region obtained by the first exposure 1*o* are converted into an odd frame 1 by the imaging circuit 113 and the A/D converter 114, and the odd frame 1 is temporarily stored in the memory region 125-1 via the multiplexer 117. Thereafter, the image processing circuit 121 reads the odd frame 1 temporarily stored in the memory region 125-1 via the multiplexer 117, and performs the image processing required for display on the read odd frame 1.

The display data 1 on which image processing for display has been performed is displayed on the LCD 130 for image display via the LCD driver 131.

Subsequently, the imaging element driving circuit 116 reads pixel signals 1*e* of the even-line region of the solid-state imaging element 112 after the predetermined first exposure time (exposure 1*e*) of the even-line region has passed. In addition, similarly to the first embodiment, second exposure 2*e* is started in the photoelectric conversion element groups of the even-line region where reading has been performed.

The pixel signals 1*e* of the even-line region obtained by the first exposure 1*e* are converted into an even frame 1 by the imaging circuit 113 and the A/D converter 114, and the even frame 1 is temporarily stored in the memory region 125-5 via the multiplexer 117. Thereafter, the image processing circuit 121 reads the even frame 1 temporarily stored in the memory region 125-5 via the multiplexer 117, and performs the image processing required for display on the read even frame 1.

The display data 2 on which image processing for display has been performed is displayed on the LCD 130 for image display via the LCD driver 131.

Subsequently, the imaging element driving circuit 116 reads pixel signals 2*o* of the odd-line region of the solid-state imaging element 112 after the predetermined second exposure time (exposure 2*o*) of the odd-line region has passed. In addition, similarly to the first embodiment, the third exposure 3*o* is started in the photoelectric conversion element groups of the odd-line region where reading has been performed.

The pixel signals 2*o* of the odd-line region obtained by the second exposure 2*o* are converted into an odd frame 2 by the imaging circuit 113 and the A/D converter 114, and the odd frame 2 is temporarily stored in the memory region 125-2 via the multiplexer 117. Thereafter, the image processing circuit 121 reads the odd frame 1 temporarily stored in the memory region 125-1 and the odd frame 2 temporarily stored in the memory region 125-2 via the multiplexer 117. The image processing circuit 121 adds the read odd frame 1 and odd frame 2 to create an odd image frame 1, and the display data 3 which has been subjected to the image processing required for display similarly to the first embodiment is displayed on the LCD 130 for image display via the LCD driver 131.

Subsequently, the imaging element driving circuit 116 reads pixel signals 2*e* of the even-line region of the solid-state imaging element 112 after the predetermined second exposure time (exposure 2*e*) of the even-line region has passed. In addition, similarly to the first embodiment, third exposure 3*e* is started in the photoelectric conversion element groups of the odd-line region where reading has been performed.

The pixel signals 2*e* of the even-line region obtained by the second exposure 2*e* are converted into an even frame 2 by the imaging circuit 113 and the A/D converter 114, and the even frame 2 is temporarily stored in the memory region 125-6 via the multiplexer 117. Thereafter, the image processing circuit 121 reads the even frame 1 temporarily stored in the memory region 125-5 and the even frame 2 temporarily stored in the memory region 125-6 via the multiplexer 117. The image processing circuit 121 adds the read even frame 1 and even frame 2 to create an even image frame 1, and the display data 4 which has been subjected to the image processing required for display similarly to the first embodiment is displayed on the LCD 130 for image display via the LCD driver 131.

Henceforth, by similarly repeating the reading of pixel signals, conversion into digital image signals, temporary storage into memory regions, addition of the digital image signals, and image processing for display until the shutter is closed, i.e., four exposures are ended, display data obtained in this period is displayed on the LCD 130 for image display via the LCD driver 131. This enables the user of the imaging device 100 to confirm an image during prolonged exposure.

In addition, since pixel signals 4$o$ of the odd-line region obtained by the fourth exposure 4$o$, and the pixel signals 4$e$ of the even-line region obtained by the exposure 4$e$ are read by the imaging element driving circuit 116 after the shutter is closed, the pixel signals are not used as the data to be displayed on the LCD 130 for image display, and are used only for creation of final image data obtained by prolonged exposure.

Additionally, when final image data obtained by prolonged exposure is recorded on the detachable memory 120 after the prolonged exposure by the imaging device 100 is ended, the image processing circuit reads all the digital image signals (the odd frames 1 to 4 and the even frames 1 to 4) which are temporarily stored, and adds all the read digital image signals. Image processing required in recording is performed on the final digital image signals obtained by adding all the digital image signals to create final image data, and the created image data is compressed and recorded on the detachable memory 120.

Next, the S/N of the final image data obtained by prolonged exposure in the second embodiment will be described.

A random noise in one reading of pixels is expressed by Expression (1) as described above.

Since exposure is performed four times in the second embodiment, both the photoelectric conversion element groups of the odd-line region and the photoelectric conversion element groups of the even-line region have four readings.

Accordingly, if this number of readings (four times) is applied to Expression (1), the random noise VRN (4) and the S/N become like Expression (4) and Expression (5), respectively.

$$VRN(4)=\sqrt{4}\times VRN=2\times VRN \quad (4)$$

$$S/N=VSIG/VRN(4)=(VSIG/VRN)\times(\tfrac{1}{2}) \quad (5)$$

Here, a finally obtained signal level is defined as VSIG, and the S/N when multiple readings are not performed is defined as VSIG/VRN.

As described above, according to the second embodiment of the present invention, even when the S/N of final image data obtained by prolonged exposure is made equal to that of the conventional method shown in FIGS. 7A and 7B, by dividing the solid-state imaging element 112 into an odd-line region and an even-line region, and performing reading for every region, the number of times of display (updated number of times) of the LCD 130 for image display to be displayed in order for the user of the imaging device 100 to confirm the image during prolonged exposure can be increased compared to the conventional method.

Third Embodiment

Figure 5:
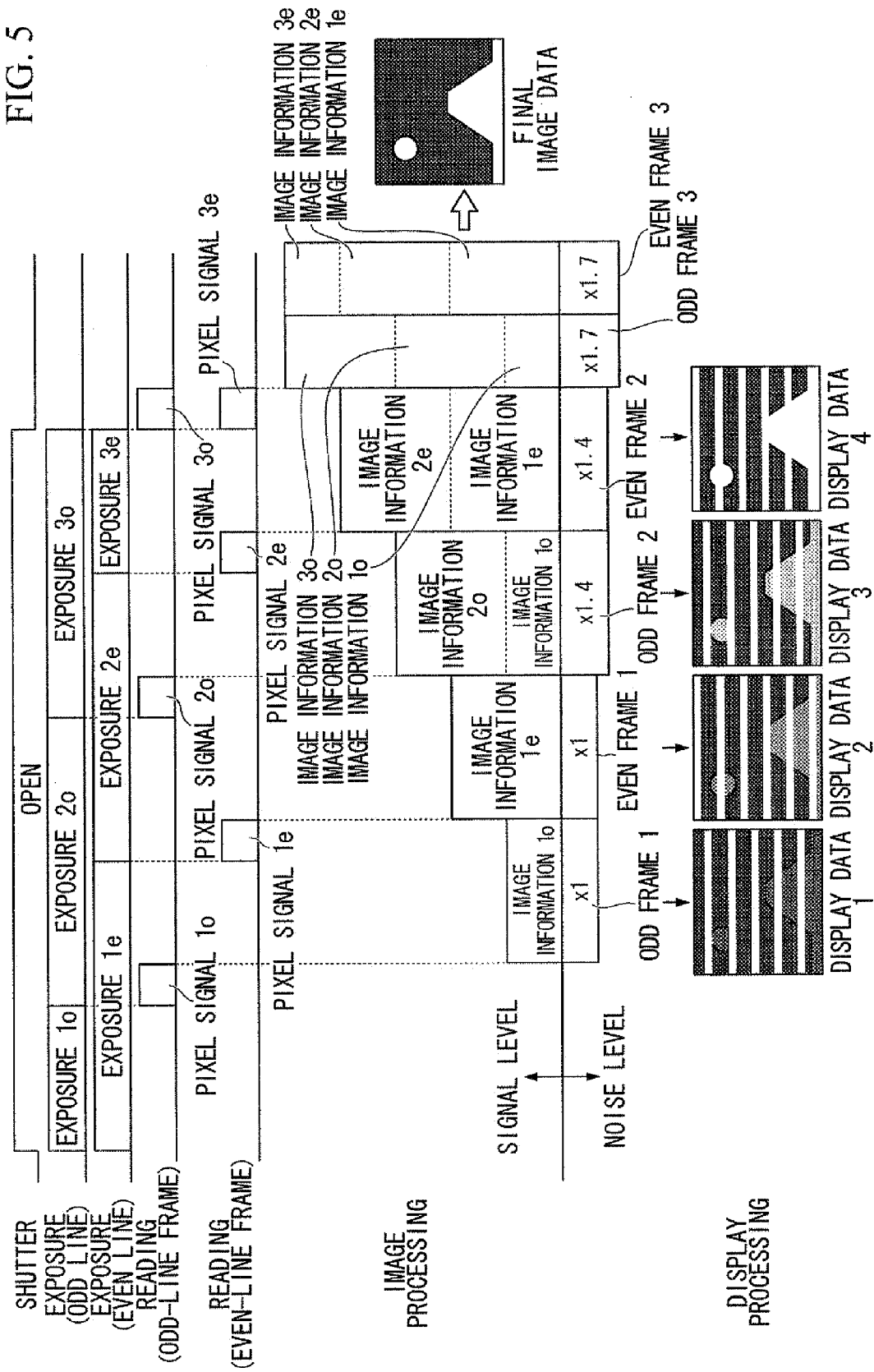
FIG. 5 is a drawing showing an example of the relationship among the exposure timing, the signal level and noise level of an obtained image, and the display, in a prolonged exposure operation of the imaging device of this embodiment.

Next, another processing in the case where prolonged exposure is performed in the imaging device 100 of this embodiment will be described. FIG. 5 is a drawing showing an example of the relationship among the exposure timing, the signal level and noise level of an obtained image, and the display, in a prolonged exposure operation of the imaging device 100 according to this embodiment. In addition, the example shown in FIG. 5 is an example where, when imaging by prolonged exposure is performed, exposure is performed three times in a shorter exposure time than the time of prolonged exposure, the noise level of final image data obtained by prolonged exposure is reduced compared to that conventionally obtained, i.e., a decrease in S/N is suppressed, and the updated number of times of an image to be displayed on the LCD 130 for image display during prolonged exposure is increased compared to the conventional number.

Additionally, the solid-state imaging element 112, the imaging element driving circuit 116, and image regions (resolution) which can be displayed by the LCD 130 for image display in this embodiment will be described as having the same configuration and operation as the first and second embodiments. Additionally, a case where the same memory regions as the first embodiment are secured as memory regions will be described.

First, if a shutter of the imaging device 100 is brought into an open state, the imaging element 112 forms an optical image of a subject which has passed through the lens group 111. That is, exposure of the odd-line region and exposure of the even-line region are simultaneously started.

Subsequently, the imaging element driving circuit 116 reads pixel signals 1$o$ of the odd-line region of the solid-state imaging element 112 after the predetermined first exposure time (exposure 1$o$) of the odd-line region has passed. In addition, similarly to the first and second embodiments, the second exposure 2$o$ is started in the photoelectric conversion element groups of the odd-line region where reading has been performed.

The pixel signals 1$o$ of the odd-line region obtained by the first exposure 1$o$ are processed similarly to the first and second embodiments, and the display data 1 which has been subjected to image processing for display is displayed on the LCD 130 for image display via the LCD driver 131.

Subsequently, the imaging element driving circuit 116 reads pixel signals 1$e$ of the even-line region of the solid-state imaging element 112 after the predetermined first exposure time (exposure 1$e$) of the even-line region has passed. In addition, similarly to the first and second embodiments, the second exposure 2$e$ is started in the photoelectric conversion element groups of the even-line region where reading has been performed.

The pixel signals 1$e$ of the even-line region obtained by the first exposure 1$e$ are processed similarly to the first and second embodiments, and the display data 2 which has been subjected to image processing for display is displayed on the LCD 130 for image display via the LCD driver 131.

Subsequently, the imaging element driving circuit 116 reads pixel signals 2$o$ of the odd-line region of the solid-state imaging element 112 after the predetermined second exposure time (exposure 2$o$) of the odd-line region has passed. In addition, similarly to the first and second embodiments, the third exposure 3$o$ is started in the photoelectric conversion element groups of the odd-line region where reading has been performed.

The pixel signals 2$o$ of the odd-line region obtained by the second exposure 2$o$ are processed similarly to the first and second embodiments, and the display data 3 which has been subjected to image processing for display is displayed on the LCD 130 for image display via the LCD driver 131.

Subsequently, the imaging element driving circuit 116 reads pixel signals 2$e$ of the even-line region of the solid-state imaging element 112 after the predetermined second exposure time (exposure 2$e$) of the even-line region has passed. In addition, similarly to the first and second embodiments, third exposure 3e is started in the photoelectric conversion element groups of the even-line region where reading has been performed.

The pixel signals 2e of the even-line region obtained by the second exposure 2e are processed similarly to the first and second embodiments, and the display data 4 which has been subjected to image processing for display is displayed on the LCD 130 for image display via the LCD driver 131.

Subsequently, when the shutter is closed, the imaging element driving circuit 116 reads the pixel signals 3o of the even-line region of the solid-state imaging element 112 which are exposed during the third exposure time (exposure 3o) of the even-line region, which has been performed until the closing of the shutter. In addition, since the shutter is closed, the exposure of the photoelectric conversion element groups of the odd-line region is ended, and subsequent exposure is not performed.

The pixel signals 3o of the odd-line region obtained by the third exposure 3o are converted into the odd frame 3 by the imaging circuit 113 and the A/D converter 114 similarly to the first embodiment, and the odd frame 3 is temporarily stored in the memory region 125-3, which is a memory region different from the memory regions in the built-in memory 125 used for storage up to the previous time, via the multiplexer 117.

Additionally, the imaging element driving circuit 116 reads the pixel signals 3e of the even-line region of the solid-state imaging element 112 which are exposed during the third exposure time (exposure 3e) of the even-line region, which has been performed until the closing of the shutter. In addition, the exposure of the photoelectric conversion element groups of the even-line region is ended, and subsequent exposure is not performed.

The pixel signals 3e of the even-line region obtained by the third exposure 3e are converted into the even frame 3 by the imaging circuit 113 and the A/D converter 114 similarly to the first embodiment, and the even frame 3 is temporarily stored in the memory region 125-7, which is a memory region different from the memory regions in the built-in memory 125 used for storage up to the previous time, via the multiplexer 117.

In addition, since the pixel signals 3o of the odd-line region obtained by the third exposure 3o, and the pixel signals 3e of the even-line region obtained by the third exposure 3e are read by the imaging element driving circuit 116 after the shutter is closed, the pixel signals are not used as the data to be displayed on the LCD 130 for image display, and are used only for the creation of final image data obtained by prolonged exposure.

Additionally, when final image data obtained by prolonged exposure is recorded on the detachable memory 120 after the prolonged exposure by the imaging device 100 is ended, the image processing circuit reads all the digital image signals (the odd frames 1 to 3 and the even frames 1 to 3) which are temporarily stored, and adds all the read digital image signals. The image processing required in recording is performed on the final digital image signals obtained by adding all the digital image signals to create final image data, and the created image data is compressed and recorded on the detachable memory 120.

Next, the S/N of the final image data obtained by prolonged exposure in the third embodiment will be described.

A random noise in one reading of pixels is expressed by Expression (1) as described above.

Since exposure is performed three times in the first embodiment, both the photoelectric conversion element groups of the odd-line region and the photoelectric conversion element groups of the even-line region have three readings.

Accordingly, if this number of readings (three times) is applied to Expression (1), the random noise VRN (3) and the S/N become like Expression (6) and Expression (7), respectively.

$$VRN(3) = \sqrt{3} \times VRN = 1.73 \times VRN \qquad (6)$$

$$S/N = VSIG/VRN(3) = (VSIG/VRN) \times (1/1.73) \qquad (7)$$

Here, a finally obtained signal level is defined as VSIG and the S/N when multiple readings are not performed is defined as VSIG/VRN.

As described above, according to the third embodiment of the present invention, the noise level of the final image data obtained by prolonged exposure can be reduced compared to that conventionally obtained by dividing the solid-state imaging element 112 into an odd-line region and an even-line region and performing reading for every region, a decrease in S/N can be suppressed, and the updated number of times an image is to be displayed on the LCD 130 for image display during prolonged exposure can be increased compared to the conventional method shown in FIGS. 7A and 7B.

According to the best modes for carrying out the present invention as described above, since the number of times of reading for one pixel is reduced by separating the reading of pixel signals from the imaging element, the random noise which increases according to the number of readings of a pixel of the imaging element can be reduced, i.e., a decrease in the S/N of the image data which is finally obtained can be suppressed.

This makes it possible to obtain final image data with high S/N even when imaging is performed while the image data during prolonged exposure is confirmed.

Additionally, since display data during prolonged exposure can be created from pixel signals which are separated and read, the number of updates of the image data during prolonged exposure can be increased.

Since this makes it possible for a user of the imaging device to serially confirm an image during prolonged exposure, it can be easily determined whether the image is an image that the user of the imaging device wants to obtain.

In addition, although a configuration in which memory regions are controlled by using the multiplexer 117 has been described in this embodiment, the present invention is not limited to this configuration. For example, memory regions which temporarily store digital image signals can be controlled using a memory controller instead of the multiplexer 117.

Additionally, although a configuration in which the addition of digital image signals temporarily stored in respective memory regions is performed by the adder 126 in the image processing circuit 121 has been described in this embodiment, the invention is not limited to this configuration. For example, it is possible to adopt a configuration in which the addition processing of the digital image signals is performed by the multiplexer 117, memory controller, or the like which controls the memory regions.

Additionally, although a configuration in which the solid-state imaging element 112 includes two regions of an odd-line region and an even-line region has been described in this embodiment, the present invention is not limited to this configuration, and the number of divisions of the imaging element can be increased to three divisions, four divisions, or the like Additionally, the configuration of photoelectric conversion element groups in a region can be changed like photoelectric conversion element groups of every other row, every two columns, or the like as well as adjacent photoelectric conversion element groups.

Additionally, in this embodiment, the timing with which the imaging element driving circuit 116 reads the solid-state imaging element 112 is described as a predetermined short exposure time within the exposure time of prolonged exposure. However, the present invention is not limited to this method. For example, the exposure time can also be determined by changing reading timing according to the brightness of a subject to be imaged or measuring the brightness of the subject in advance (may be calculated from the previous imaging result).

That is, according to the present invention, even when final image data is obtained by adding image information obtained by performing multiple exposures, image data during prolonged exposure can be displayed by alternately reading pixel rows, and the number of readings for one pixel can be reduced. Thus, a decrease in S/N of the final image data obtained can be suppressed.

Additionally, when the S/N of the image data finally obtained is made equivalent to that conventionally obtained, the number of times the image data is displayed during prolonged exposure can be increased.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:

1. An imaging device comprising:
   a pixel array in which a plurality of pixels including a first pixel and a second pixel, which have photoelectric conversion elements and which output pixel signals according to the quantities of incident light to the photoelectric conversion elements, are arranged two-dimensionally;
   a reading unit that alternately reads plural times an operation for reading a first pixel signal from the first pixel and an operation for reading a second pixel signal from the second pixel;
   a pixel signal addition unit that adds the first pixel signal read from the first pixel with a plurality of different timings and adds the second pixel signal read from the second pixel with a plurality of different timings; and
   a display unit that alternately displays plural times the first pixel signal added by the pixel signal addition unit and the second pixel signal added by the pixel signal addition unit every time the signal is added.

2. The imaging device according to claim 1, wherein in the pixel array, the first and second pixels, each of which comprises the photoelectric conversion elements that are arranged in a row direction, are alternately arranged in a column direction.

3. The imaging device according to claim 1, wherein in the pixel array, the first and second pixels, each of which comprises the photoelectric conversion elements that are arranged in a column direction, are alternately arranged in a row direction.

4. The imaging device according to claim 1, wherein in the pixel signal addition unit, the number of times in which the read first pixel signal is added and the number of times in which the read second pixel signal is added are the same number of times.

5. The imaging device according to claim 1, wherein the exposure of the first pixel and the exposure of the second pixel are performed on the same subject.

\* \* \* \* \*